(12) United States Patent
Ybarra, Jr. et al.

(10) Patent No.: US 10,807,665 B1
(45) Date of Patent: Oct. 20, 2020

(54) PORTABLE AND COLLAPSIBLE BIKE STAND

(71) Applicant: PropIt LLC, Chesapeake, VA (US)

(72) Inventors: Ramon Ybarra, Jr., Chesapeake, VA (US); Vicente R. Ybarra, Virginia Beach, VA (US)

(73) Assignee: PROP IT LLC, Chesapeake, VA (US)

( * ) Notice: Subject to any disclaimer, the term of this patent is extended or adjusted under 35 U.S.C. 154(b) by 0 days.

(21) Appl. No.: 16/729,770

(22) Filed: Dec. 30, 2019

(51) Int. Cl.
*B62H 3/10* (2006.01)
*F16M 11/28* (2006.01)

(52) U.S. Cl.
CPC ............... *B62H 3/10* (2013.01); *F16M 11/28* (2013.01); *F16M 2200/028* (2013.01)

(58) Field of Classification Search
CPC .... B62H 3/10; F16M 11/28; F16M 2200/028; A47B 96/02; A47B 47/0058; A47B 96/14; A47B 2220/12; A47B 47/0091
USPC .................................................. 248/432, 165
See application file for complete search history.

(56) References Cited

U.S. PATENT DOCUMENTS

| | | | | |
|---|---|---|---|---|
| 578,886 A * | 3/1897 | Le Fevre | ................. | B62H 3/02 211/22 |
| 602,665 A * | 4/1898 | McBurney et al. | ..... | B62H 3/10 211/22 |
| 1,763,748 A * | 6/1930 | Best | ........................ | F16B 12/48 403/219 |
| 2,150,397 A * | 3/1939 | Owen | ................... | A47B 23/046 108/8 |
| 4,171,790 A * | 10/1979 | Crescenti | ................ | A47G 7/041 248/27.8 |
| 4,245,808 A * | 1/1981 | John | ......................... | B66F 3/08 248/165 |
| 4,406,437 A * | 9/1983 | Wright | .................... | F16M 11/22 248/188.7 |
| 4,433,843 A * | 2/1984 | Bricco | ....................... | F41J 1/10 248/165 |
| 4,590,695 A * | 5/1986 | McGillivray | ............ | D05C 1/04 248/278.1 |
| 4,969,657 A * | 11/1990 | Kaufmann | ............ | B62B 5/0083 248/165 |
| 5,357,699 A * | 10/1994 | Padawer | ................. | A47B 29/00 248/124.1 |
| 6,212,800 B1 * | 4/2001 | Bagley | ...................... | D05C 1/02 38/102.1 |
| 6,386,491 B1 * | 5/2002 | Bissett | ....................... | A47F 5/04 211/205 |
| 7,878,482 B2 * | 2/2011 | Hernandez, Jr. | .......... | B66F 3/30 254/89 H |
| 8,225,726 B1 * | 7/2012 | Fineberg | .................. | A47B 3/06 108/158.12 |

(Continued)

*Primary Examiner* — Ko H Chan
(74) *Attorney, Agent, or Firm* — Peter J. Van Bergen

(57) ABSTRACT

A bike stand includes a base that has a sleeve that is open-ended at a first end of the base and that has a first notch at a second end of the base. A support slides within the sleeve and extends partially therefrom. The support terminates in a cradle disposed outside of the sleeve. A locking structure cooperating with the sleeve and support fixes the support relative to the base. A rail has a second notch for engagement with the first notch in the base wherein a surface of the base and a surface of the rail are coplanar and wherein the rail and base are disposed perpendicular to one another.

13 Claims, 5 Drawing Sheets

(56) References Cited

U.S. PATENT DOCUMENTS

| | | | | |
|---|---|---|---|---|
| 8,851,301 B1* | 10/2014 | Ho | ............................ | B62H 3/10 |
| | | | | 211/20 |
| 8,876,145 B1* | 11/2014 | Bernal | .................. | B62B 5/0093 |
| | | | | 280/638 |
| 9,700,146 B1* | 7/2017 | Emerson | ................... | A47C 7/72 |
| 10,072,791 B2* | 9/2018 | Beta | ........................ | A47B 81/00 |
| 2007/0175848 A1* | 8/2007 | Mallen | ............... | A47G 25/0671 |
| | | | | 211/196 |

* cited by examiner

US 10,807,665 B1

PORTABLE AND COLLAPSIBLE BIKE STAND

FIELD OF THE INVENTION

The invention relates generally to bike stands, and more particularly to a bike stand that can be quickly assembled or collapsed such that a bike rider can easily transport the bike stand with them while riding.

BACKGROUND OF THE INVENTION

Bicycle types and sizes are as varied as the people that ride them. However, one thing all bicycles have in common is their inability to stay upright on their own. While some bicycles include a kickstand, the vast majority do not. Accordingly, when a bicycle rider wants to take a break during a ride, they must find some "structure" (e.g., wall, fence, light, post tree, etc.) to prop their bicycle against, or lay their bicycle down on the ground.

SUMMARY OF THE INVENTION

Accordingly, it is an object of the present invention to provide a portable bicycle stand.

Another object of the present invention is to provide a bicycle stand that is readily carried by a bicycle rider.

Still another object of the present invention is to provide a collapsible bicycle stand that can readily fit into a pocket of clothing worn by a bicycle rider or within a bicycle-mounted pack or bag.

Other objects and advantages of the present invention will become more obvious hereinafter in the specification and drawings.

In accordance with the present invention, a bike stand includes a base that has a sleeve open-ended at a first end of the base and that has a first notch at a second end of the base. A support is slidably engaged in the sleeve and extends partially therefrom. The support terminates in a cradle disposed outside of the sleeve. A locking structure cooperating with the sleeve and support fixes the support relative to the base wherein the cradle is positioned at a selected distance from the first end of the base. A rail has a second notch for engagement with the first notch in the base wherein a surface of the base and a surface of the rail are coplanar and wherein the rail and base are disposed perpendicular to one another.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
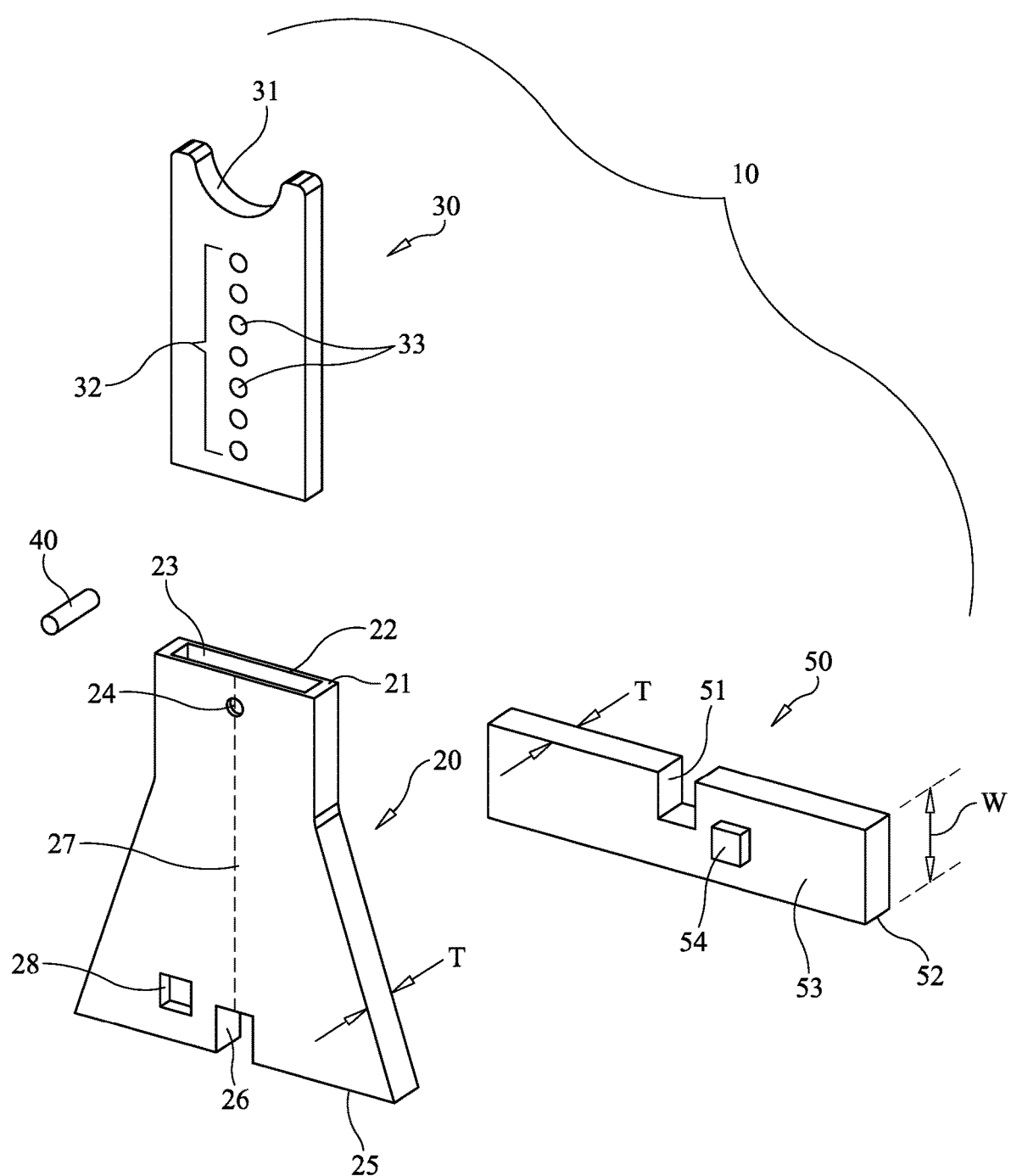
FIG. 1 is a perspective view of a fully disassembled bicycle stand in accordance with an embodiment of the present invention.
Figure 2:
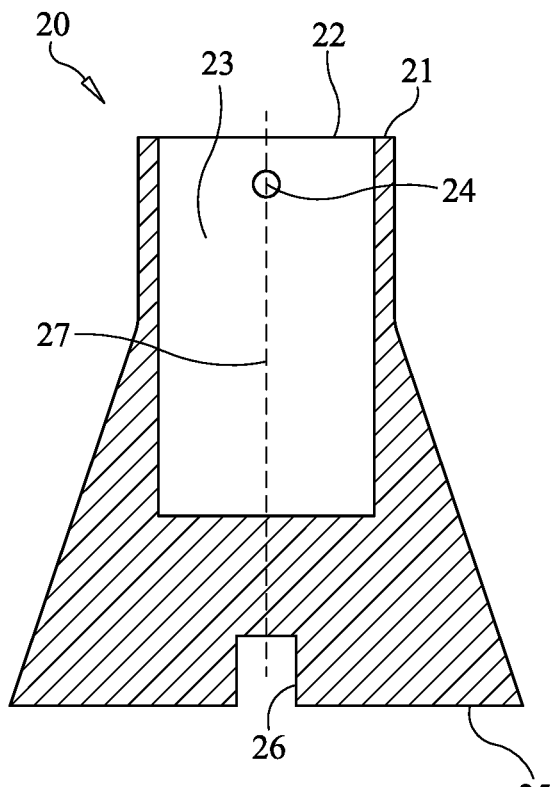
FIG. 2 is a cross-sectional view of the bicycle's base.
Figure 3:
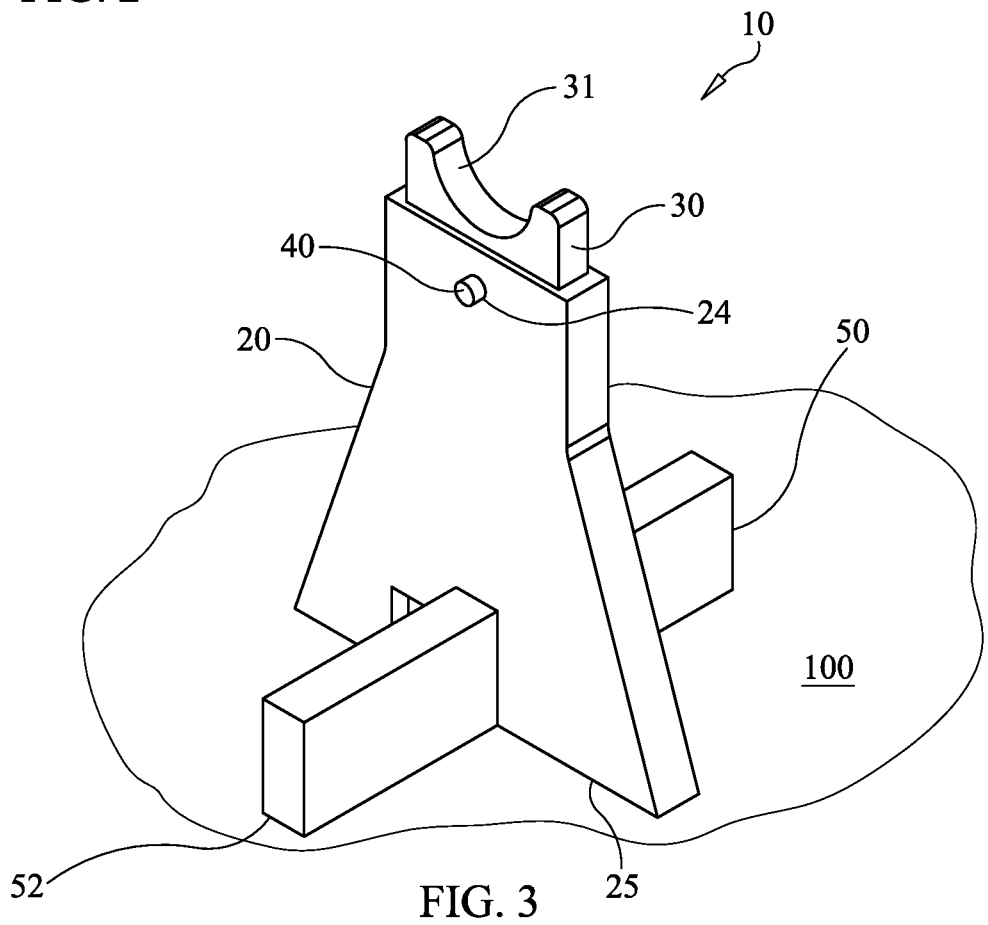
FIG. 3 is a perspective view of the bicycle stand shown in FIG. 1 configured for use.
Figure 4:
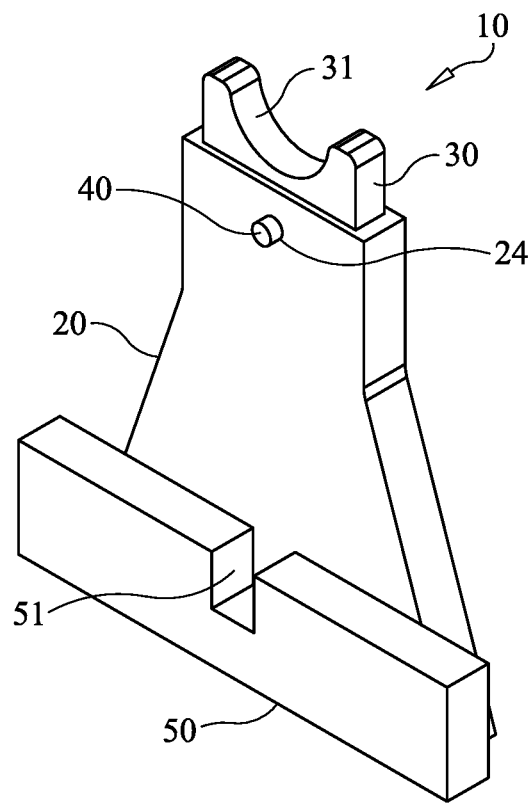
FIG. 4 is a perspective view of the bicycle stand shown in FIG. 1 configured for transport.
Figure 5:
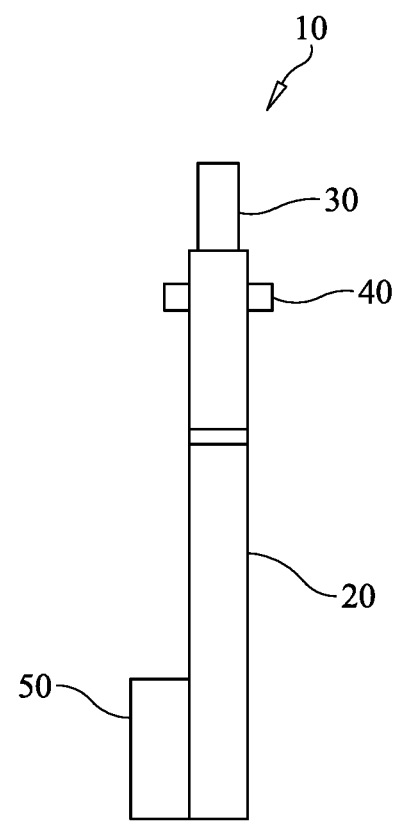
FIG. 5 is a side view of the bicycle stand in FIG. 4.

Referring now to the drawings, simultaneous reference will be made to FIGS. 1-5 where a collapsible and portable bicycle stand in accordance with an embodiment of the present invention is shown and is referenced generally by numeral 10. As will be explained further below, bicycle stand 10 is readily assembled for use and disassembled for transport in, for example, the pocket of a bicycle rider's clothing (e.g., jersey, jacket, pants, etc.) or in a bicycle-mounted pack or bag. When assembled for use, bicycle stand 10 cooperates with a bicycle pedal's spindle (not shown) to support a bicycle in an upright position.

Bicycle stand 10 includes a base 20, a bicycle support leg 30, a retaining pin 40, and a rail 50. In general, each element of bicycle stand 10 is made from a rigid material (e.g., metal, plastic, composite, etc.). All elements could be made from the same material, or different materials could be used for different elements without departing from the scope of the present invention.

For portability, base 20 is a generally flat structure (e.g., a substantially constant thickness "T" on the order of 0.25-0.5 inches thick) that provides a sleeve housing for support leg 30, a coupling mechanism for rail 50 when bicycle stand 10 is assembled for use, and a coupling mechanism for rail 50 when bicycle stand 10 is configured for transport. More specifically, base 20 has a top end 21 defining the opening 22 of a sleeve 23 defined in the base. Opening 22 and sleeve 23 are sized such that support leg 30 can slide back-and-forth therein. A through hole 24 extends across base 20 and through sleeve 23. Through hole 24 can be centrally positioned relative to the width sleeve 23. Base 20 has a planar bottom end 25 that will rest on a surface 100 (FIG. 3) when bicycle stand 10 is configured for use. A rectangular notch 26 is defined in base 20 at bottom end 25. Notch 26 extends through the thickness of base 20. The centers of sleeve 23 and notch 26 can be aligned with one another as indicated by dashed line 27 in FIG. 1. Base 20 also has a socket 28 defined in a face thereof configured for press-fit engagement with a complimentary post on rail 50 when bicycle stand 10 is configured for transport (FIGS. 4 and 5) as will be described further below.

Support leg 30 is configured to slide within sleeve 23 and such that the overall height of bicycle stand 10 (i.e., from planar bottom end 25 up to the exposed top of support leg 30) is adjustable. More specifically, one end of support leg 30 defines a U-shaped cradle 31 sized and shaped to cradle a pedal spindle or bottom bracket spindle of a bicycle to be supported by bicycle stand 10. Support leg 30 also has a linear arrangement 32 of spaced-apart holes 33. When assembled, one of holes 33 is aligned with through hole 24 passing through base 20 as described above. In the illustrated embodiment, linear arrangement 32 is aligned with center line 27. The selection of one of holes 33 with through hole 24 determines how much of support leg 30 extends from sleeve 23 and, therefore, the overall height of bicycle stand 10. Retaining pin 40 is inserted through the aligned holes 33 and 24 to lock the position support leg 30 relative to base 20. Pin 40 can be headless (as shown) or have a head, and can be free-standing (as shown) or could be tethered to base 20, without departing from the scope of the present invention.

Rail 50 provides stability for bicycle stand 10 in a direction that is perpendicular to planar bottom end 25 of base 20. Rail 50 includes a rectangular notch 51 at approximately its longitudinal center as shown in the illustrated embodiment. Notch 51 is sized to be equal to that of notch 26. Accordingly, the thickness "T" of rail 50 at least in the region of notch 51 is the same as the thickness "T" of base 20 at least in the region of notch 26. When bicycle stand 10 is to be assembled, rail 50 is positioned perpendicular to planar bottom end 25 and notch 51 is aligned with notch 26. Rail 50 is then pressed into engagement with planar bottom end 25 of base 20. The width "W" of rail 50 is configured such that longitudinal surface 52 of rail 50 is co-planar with the surface of planar bottom end 25 thereby allowing all of surface 52 and planar bottom end 25 to rest on surface 100 (FIG. 3) when bicycle stand is assembled for use.

A face surface 53 of rail 50 has a post 54 defined thereon and extending therefrom. As mentioned above, post 54 is configured for press-fit engagement with socket 28. More specifically, when bicycle stand 10 is to be configured for transport (FIGS. 4 and 5), rail 50 is disengaged from base 20, is positioned such that post 54 is aligned with socket 28, and is pressed towards base 20 thereby coupling rail 50 to base 20 for transport. It is to be understood that this post-and-socket coupling could be reversed (i.e., post and base 20 and socket on rail 50) without departing from the scope of the present invention. Further, it is to be understood that the present invention is not limited to a rectangular post-and-socket coupling as other geometries could be employed without departing from the scope of the present invention. Still further, the position of the post-and-socket coupling is not a limitation of the present invention. For example, the post-and-socket coupling could be positioned such that rail 50 resided fully within the exterior confines of base 20 when bicycle stand 10 is configured for transport.

Figure 6:
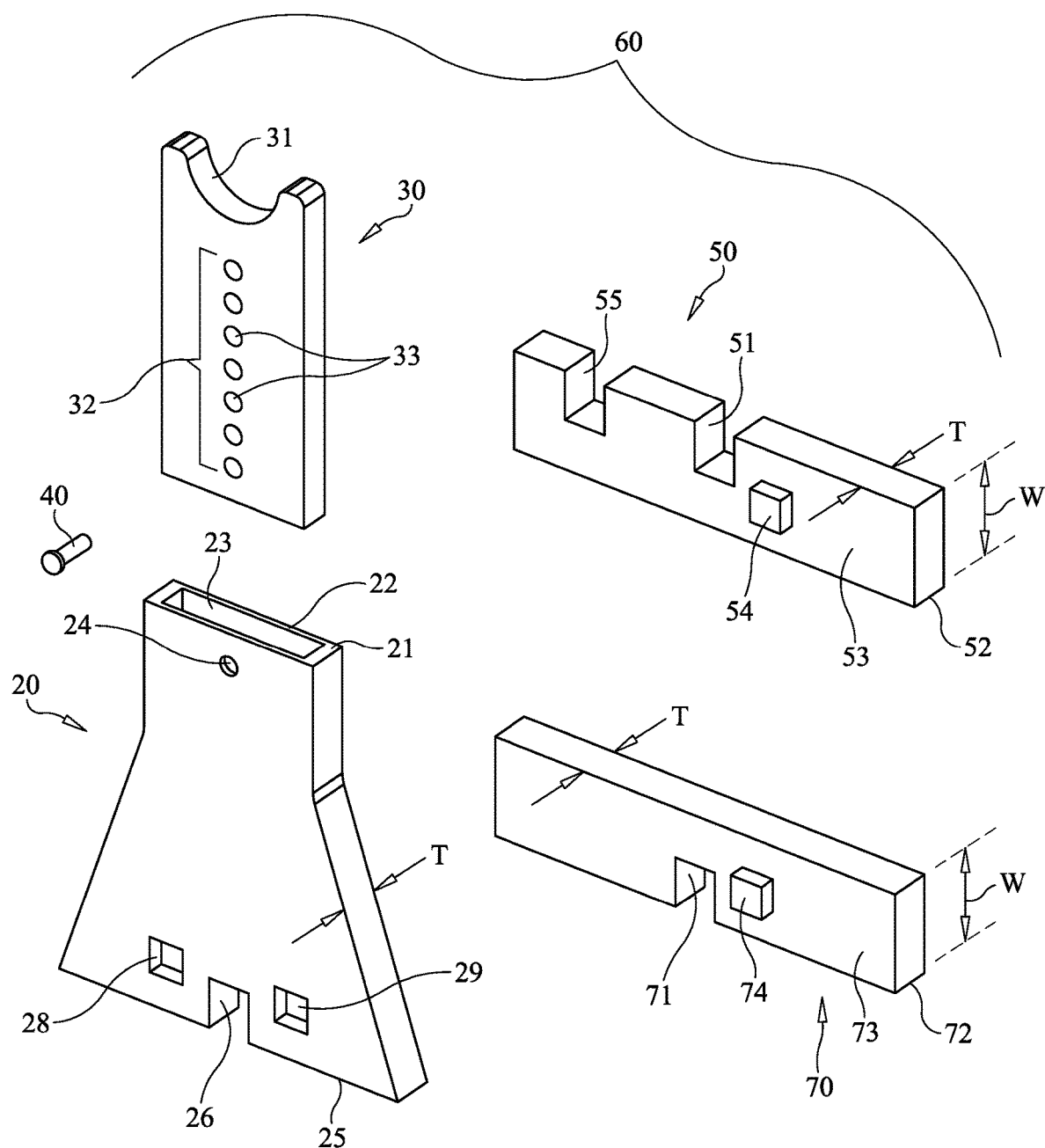
FIG. 6 is a perspective view of a fully disassembled bicycle stand in accordance with another embodiment of the present invention.
Figure 7:
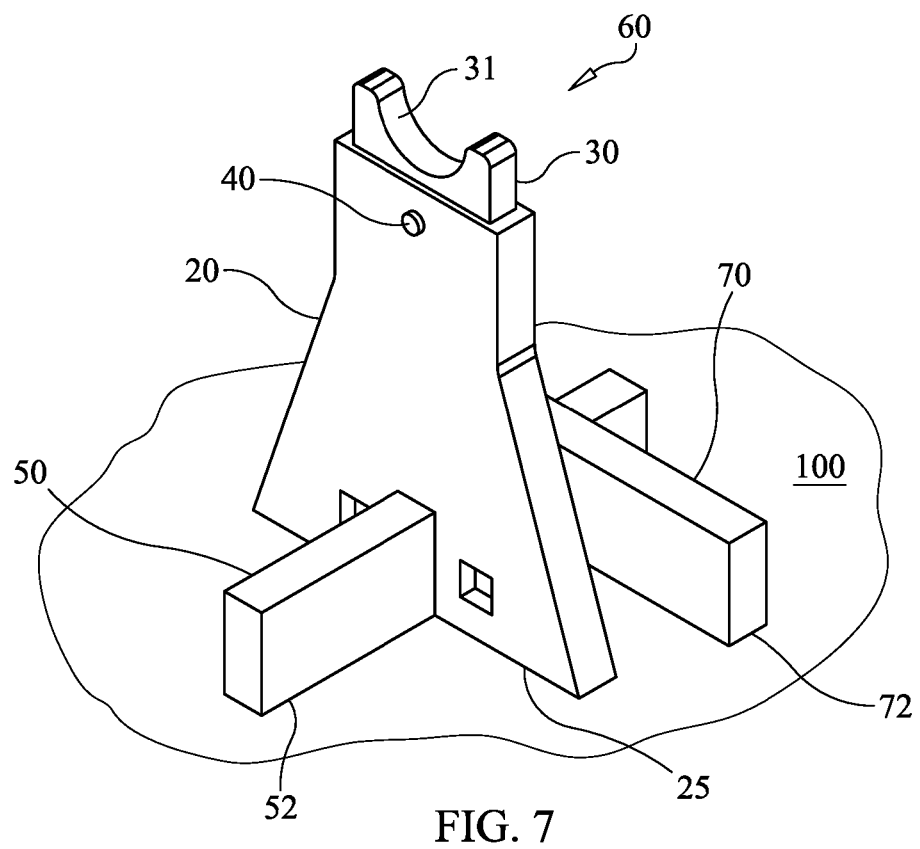
FIG. 7 is a perspective view of the bicycle stand shown in FIG. 6 configured for use.
Figure 8:
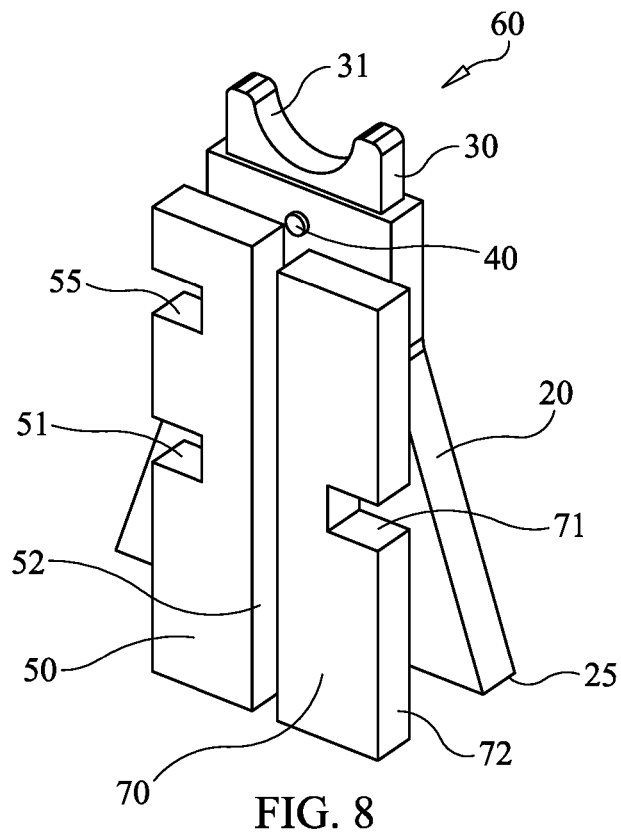
FIG. 8 is a perspective view of the bicycle stand shown in FIG. 6 configured for transport.

The present invention is not limited to the embodiment and its variations described above. For example, in another embodiment of the present invention, a second rail can be provided to enhance stability of the bicycle stand as will now be explained with reference to a bicycle stand 60 shown in FIGS. 6-8 where elements described previously herein are referred to using the same numerals and will not be described further herein. Briefly, bicycle stand 60 differs from bicycle stand 10 in that rail 50 is modified to cooperate with a second rail 70. More specifically, rail 50 has a second notch 55 that can be rectangular (as shown) but that is matched in size and shape to rectangular notch 71 on rail 70 such that notches 55 and 71 can engage one another to couple rail 70 to rail 50 with rail 70 being perpendicular to rail 50. Accordingly, the thickness "T" of rail 70 is the same as the thickness "T" of rail 50 at least in the regions of the rails where notches 55 and 71 are to be engaged with one another. When bicycle stand 60 is assembled for use (FIG. 7), rail 70 is perpendicular to rail 50 and parallel to planar bottom end 25 of base 20. The combination of rails 50 and 70 with planar bottom end 25 enhances the stability of bicycle stand 60.

The width "W" of rail 70 is configured such that a longitudinal surface 72 of rail 70 is co-planar with longitudinal surface 52 of rail 50 when rails 50 and 70 are joined using notches 55 and 71, respectively. In this way, a co-planar support surface for bicycle stand 60 is defined by longitudinal surfaces 52 and 72 along with planar bottom end 25.

The above-described post-and-socket coupling between base 20 and rail 50 is repeated for base 20 and rail 70. For example, a second socket 29 can be provided in base 20 and complimentary post 74 can be provided on a face surface 73 of rail 70. When rail 70 is not coupled to rail 50 as described above, the post-and-socket coupling can be used to couple rail 70 to base 20 for transport of bicycle stand 60.

The advantages of the present invention are numerous. The bicycle stand is easily configured for use and transport. The stand can be adjusted in height to work with a variety of bicycle types and sizes. The stand's compact and flat structure makes it easy to transport in one's clothing or in a bicycle-mounted pack or bag.

Although the invention has been described relative to a specific embodiment thereof, there are numerous variations and modifications that will be readily apparent to those skilled in the art in light of the above teachings. For example, the exterior configuration of the base can be other than that shown without departing from the scope of the present invention. The stand alone or tethered pin used to lock the support leg to the base's sleeve could be replaced by a spring-loaded pin or a bull-and-detent locking structure without departing from the scope of the present invention. It is therefore to be understood that, within the scope of the appended claims, the invention may be practiced other than as specifically described.

What is claimed as new and desired to be secured by Letters Patent of the United States is:

1. A portable bike stand, comprising:
    a base having a thickness T not to exceed 0.5 inches, said base including a sleeve that is open-ended at a first end of said base and a first notch at a second planar end of said base;
    a support including an integral cradle at one end thereof, said support and said integral cradle having a thickness less than T for sliding engagement in said sleeve;
    a locking structure cooperating with said sleeve and said support for fixing said support relative to said base wherein said integral cradle is positioned at a selected distance from said first end of said base and is adapted to cradle a pedal spindle on a bicycle;
    a rail having a first longitudinal surface that includes a second notch for engagement with said first notch, said rail having a second longitudinal surface, wherein said second planar end of said base and said second longitudinal surface of said rail are a coplanar contiguous surface when said second notch is in engagement with said first notch, and wherein said rail and said base are disposed perpendicular to one another;
    a post coupled to said rail; and
    a socket provided in said base, said socket being configured for a press-fit engagement with said post wherein, when said second notch is not engaged with said first notch, said rail and said base can be coupled to one another via said press-fit engagement wherein said base with said support fixed thereto and said rail are adapted for transport by a bicycle rider in one of the bicycle rider's clothing and the bicycle rider's pack.

2. The portable bike stand as in claim 1, wherein said first notch and said second notch are rectangular notches.

3. The portable bike stand as in claim 1, wherein said support includes a linear arrangement of holes passing therethrough, wherein said base includes a through hole passing through said sleeve, and wherein said locking structure comprises a pin for engaging said through hole and one of said holes from said linear arrangement aligned with said through hole.

4. The portable bike stand as in claim 1, wherein a center of said sleeve is aligned with a center of said first notch.

5. The portable bike stand as in claim 1, wherein said second notch is centrally positioned in said rail.

6. The portable bike stand as in claim 1, wherein a thickness of said base at said first notch is equal to a thickness of said rail at said second notch.

7. The portable bike stand as in claim 1, further comprising:
a third notch in said first longitudinal surface of said rail spaced apart from said second notch; and
a second rail having a fourth notch for engagement with said third notch wherein a surface of said second rail is coplanar with said coplanar contiguous surface and wherein said rail and said second rail are disposed perpendicular to one another.

8. The portable bike stand as in claim 7, further comprising:
a post coupled to one of said second rail and said base; and
a socket provided in another of said second rail and said base, said socket being configured for press-fit engagement with said post wherein, when said fourth notch is not engaged with said third notch, said second rail and said base can be coupled to one another via said press-fit engagement.

9. The portable bike stand as in claim 7, wherein a thickness of said base at said first notch is equal to a thickness of said rail at said second notch, and wherein a thickness of said rail at said third notch is equal to a thickness of said second rail at said fourth notch.

10. A portable bike stand, comprising:
a base having a thickness T not to exceed 0.5 inches, said base including a sleeve that is open-ended at a first end of said base, said base having a notched region at a second planar end of said base;
a support including an integral cradle at one end thereof, said support to include said integral cradle having a thickness less than T for sliding engagement in said sleeve;
a locking structure cooperating with said sleeve and said support for fixing said support relative to said base wherein said integral cradle is positioned at a selected distance from said first end of said base and is adapted to cradle a pedal spindle on a bicycle;
a plurality of rails, each of said rails having at least one notch for engagement with one of said notched region of said base and said at least one notch of another of said rails;
said plurality of rails including a first rail for engagement of said notched region of said base;
said plurality of rails including a second rail for engagement of said at least one notch of said first rail,
wherein a combination of said second planar end of said base, a surface of said first rail, and a surface of said second rail are a coplanar contiguous surface,
wherein said first rail and said base are disposed perpendicular to one another, and
wherein said first rail and said second rail are disposed perpendicular to one another;
a post coupled to each of said first rail and said second rail; and
two sockets provided in said base, each of said two sockets being configured for a press-fit engagement with one said post wherein, when said first rail is not engaged with said notched region of said base and said second rail is not engaged with said at least one notch of said first rail, said first rail and said second rail can be coupled to said base via said press-fit engagement wherein said base with said support fixed thereto, said first rail, and said second rail are adapted for transport by a bicycle rider in one of the bicycle rider's clothing and the bicycle rider's pack.

11. The portable bike stand as in claim 10, wherein said notched region and each of said at least one notch comprise rectangular notches.

12. The portable bike stand as in claim 10, wherein said support includes a linear arrangement of holes passing there through, wherein said base includes a through hole passing through said sleeve, and wherein said locking structure comprises a pin for engaging said through hole and one of said holes from said linear arrangement aligned with said through hole.

13. The portable bike stand as in claim 10, wherein a center of said sleeve is aligned with a center of said notched region.

* * * * *